(12) United States Patent
Haltom

(10) Patent No.: US 8,913,493 B2
(45) Date of Patent: Dec. 16, 2014

(54) OBTAINING AND USING CONFIDENCE METRIC STATISTICS TO IDENTIFY DENIAL-OF-SERVICE ATTACKS

(75) Inventor: Jeffrey Allen Haltom, Fishers, IN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 176 days.

(21) Appl. No.: 13/571,622

(22) Filed: Aug. 10, 2012

(65) Prior Publication Data

US 2014/0044017 A1 Feb. 13, 2014

(51) Int. Cl.
*H04L 12/26* (2006.01)

(52) U.S. Cl.
USPC ............................ 370/230; 370/252; 379/249

(58) Field of Classification Search
USPC .................................. 370/230, 252; 379/249
See application file for complete search history.

(56) References Cited

U.S. PATENT DOCUMENTS

| | | | |
|---|---|---|---|
| 7,380,010 B1* | 5/2008 | Oran | 709/227 |
| 2004/0111632 A1* | 6/2004 | Halperin | 713/200 |
| 2006/0039540 A1* | 2/2006 | Issinski | 379/45 |
| 2006/0245550 A1* | 11/2006 | Ferguson et al. | 379/32.01 |
| 2009/0293123 A1* | 11/2009 | Jackson et al. | 726/23 |
| 2013/0216027 A1* | 8/2013 | Rados et al. | 379/32.01 |

OTHER PUBLICATIONS

Seung Wook Jung, "CAPTCHA-based DDoS Defense System of Call Centers against Zombie Smart-Phone", Jul. 3, 2012, International Journal of Security and it Applications, pp. 29-36.*

* cited by examiner

*Primary Examiner* — Jason Mattis

(57) ABSTRACT

A system may receive data collected by a network for a plurality of calls that are to be routed by the network to a call center, detect an event based on the received data, determine a confidence level, for the event, that the event is a denial-of-service attack, determine a call service to be provided to the call center in response to detecting the event, and provide the call service based on the confidence level.

20 Claims, 11 Drawing Sheets

| CALL ID 802 | SOURCE/ TYPE 804 | DESTINATION/ TYPE 806 | SOURCE LOCATION 808 | TIME 810 | DURATION 812 | CALL CENTER 814 | YEAR-MONTH-DAY 816 | DENIAL-OF-SERVICE ATTACK 816 |
|---|---|---|---|---|---|---|---|---|
| 703-229-4012 | 171.12.14.33/ IP | 301-234-2241/TDM | DISTRICT OF COLUMBIA | 14:32 | 00:30 | 301-234-2000 | 2012-10-12 | YES |

OBTAINING AND USING CONFIDENCE METRIC STATISTICS TO IDENTIFY DENIAL-OF-SERVICE ATTACKS

BACKGROUND

When many calls arrive at a call center within a short period of time, the calls may prevent the call center from processing other calls. Some of the calls that flood a call center may be the result of a denial-of-service attack against the call center.

BRIEF DESCRIPTION OF THE DRAWINGS

FIG. 8 illustrates an exemplary portion of the call database of FIG. 6;

DETAILED DESCRIPTION

The following detailed description refers to the accompanying drawings. The same reference numbers in different drawings may identify the same or similar elements. As used herein, the term "denial-of-service" may include preventing or denying a user from accessing or using resources. The resources may include, for example, processing power, memory/storage, database, channels assigned to/for a customer/network utilization, etc. As used herein, the term "denial-of-service attack" may include an attempt to prevent a system from providing such a resource.

As described below, a system may collect call statistics for a network. When new calls arrive at the network, the system determines a level of confidence, for the calls, that the calls are denial-of-service attack calls based on the call statistics. The system may provide information about the calls to a client, to which the calls are to be forwarded/routed, route the calls to the client, test the callers to obtain additional information about the callers, or drop one or more of the calls.

Testing a caller may include a passive test (collecting information about the caller) and/or sending a query. For example, the system may request the caller to answer a question. If the answer to the question is correct, the system may determine that the caller is likely to be a person (or a desired calling agent) rather than a machine, and switch/route the call to the client. If the answer is incorrect, the system may drop the call.

The system may provide the client with an opportunity to provide a feedback about the calls. If the client does provide a feedback, the system may use the feedback to augment the call statistics.

Figure 1:
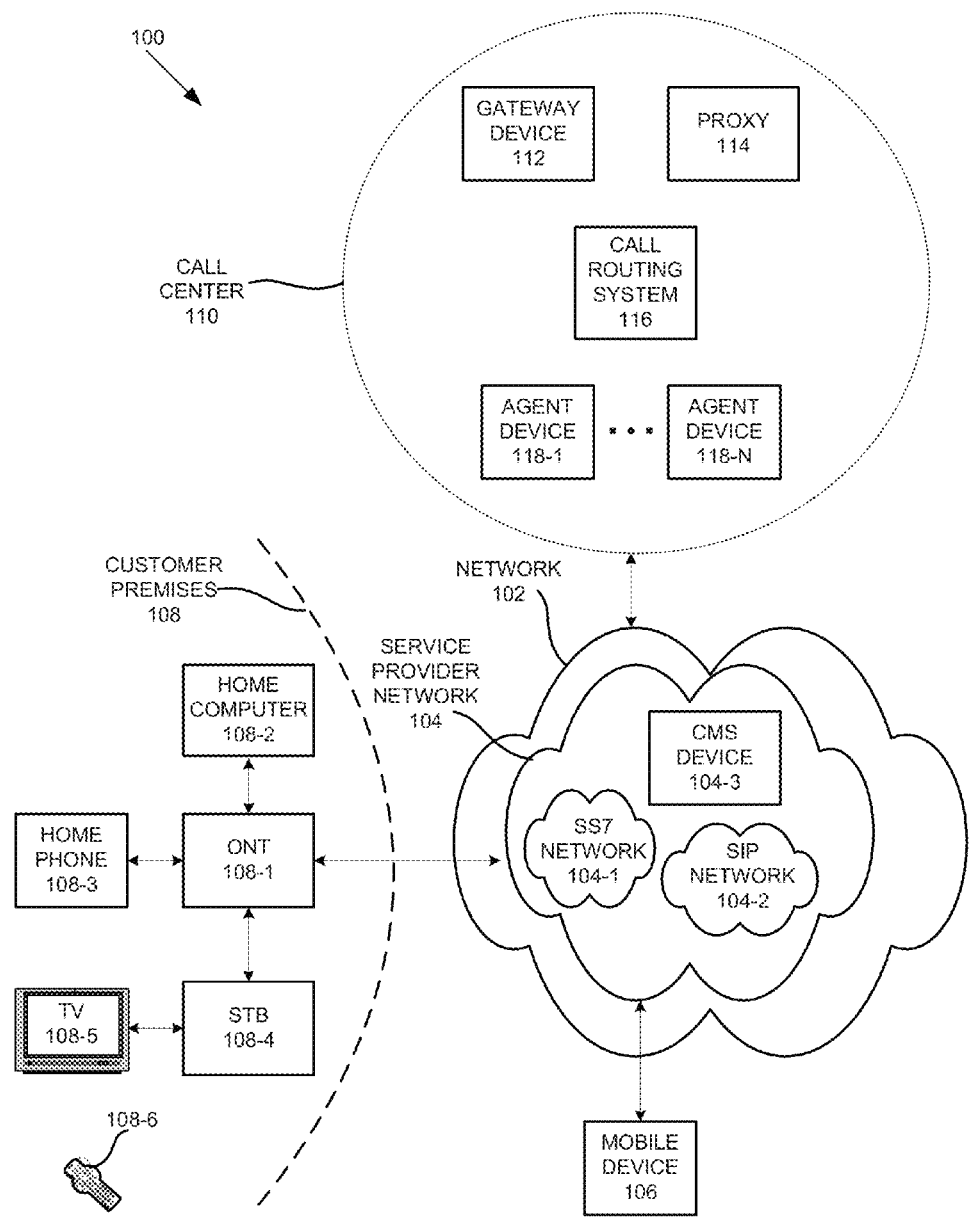
FIG. 1 illustrates an exemplary environment in which concepts described herein may be implemented.

FIG. 1 is a diagram of an exemplary environment 100 in which the concepts described herein may be implemented. Environment 100 may include a network 102, a mobile device 106, a customer premises 108, and a call center 110.

Network 102 may include one or more packet switched networks, such as an Internet protocol (IP) based network, a local area network (LAN), a wide area network (WAN), a personal area network (PAN), an intranet, the Internet, a cellular network, a fiber-optic network, or another type of network that is capable of conveying data. Network 102 may also include a circuit-switched network, such as a public-switched telephone network (PSTN) for providing telephone services for traditional telephones. Network 102 may allow devices at customer premises 108 (e.g., STB 108-4) to connect to other devices also attached to network 102. For example, network 102 may provide a communication path from a home phone 108-3 to call center 110.

In FIG. 1, network 102 includes a service provider network 104, which in turn includes Signaling System No. 7 (SS7) network 104-1, a Session Initiation Protocol (SIP) network 104-2, and a confidence metric server (CMS) device 104-3.

SS7 network 104-1 provides switching services for plain old telephone system (POTS) calls. For example, SS7 network 104-1 routes a POTS call from a POTS telephone to another POTS telephone.

SIP network 104-2 includes an IP network and devices that support the SIP protocol and communication (e.g., registration device, session border controllers (SBC) devices, a proxy server device, etc.).

CMS device 104-3 may collect call statistics, provide the call statistics to users, and/or provide the statistics and other information to network devices for controlling call routing. The network devices may drop calls or allow calls to reach their destinations based on the information.

In collecting the call statistics, CMS device 104-3 may receive feedback information, from call center 110, that indicates whether particular calls routed via networks 104-1 and/or 104-2 are denial-of-service attack calls. Based on the feedback and data collected from other devices in networks 104-1 and 104-2, CMS device 104-3 may generate a statistics database/table, from which CMS device 104-3 can determine the confidence level that a group of incoming calls is a denial-of-service attack. CMS device 104-3 may provide information in the database and/or a confidence level associated with calls to other devices in networks 104-1 and 104-2 and/or call center 110.

Mobile device 106 may include a radiotelephone, a smart phone, a laptop, a tablet computer, or another portable communication device. Mobile device 106 may communicate with other devices via one or more communication towers (not shown) using a wireless communication protocol, e.g., GSM (Global System for Mobile Communications), CDMA (Code-Division Multiple Access), WCDMA (Wideband CDMA), IEEE 802.11x, etc. Mobile device 106 may be associated with a phone number. Mobile device 106 may be considered a "user device" or "client device." Mobile device 106 may be located outside or inside customer premises 108.

Customer premises 108 (e.g., the customer's home) may include an optical network terminal (ONT) 108-1, a home computer 108-2, a home phone 108-3, a set-top box (STB) 108-4, a TV 108-5, and a remote control 108-6. Devices in customer premises 108, such as home computer 108-2, home phone 108-3, STB 108-4, TV 108-5, and remote control 108-6 also may each be a "user device" or a "client device."

ONT 108-1 may receive data, e.g., on a fiber optic cable, and may transfer the data to the appropriate device in customer premises 108, such as computer 108-2 or STB 108-4.

Likewise, ONT 108-1 may receive data from any device in customer premises 108 and may transmit the data to other devices in environment 100, e.g., through a fiber optic cable. ONT 108-1 may provide customer premises 108 with Internet access, television access, and/or telephone service, for example.

Computer 108-2 may include a laptop, a desktop, a tablet computer, a mobile telephone, a personal digital assistant (PDA), a gaming console, or another portable communication device. Computer 108-2 may include a microphone for capturing audio and/or a camera for capturing images or video. Computer 108-2 may also include a display for showing images or video or a speaker for playing audio. Home phone 108-3 may include a POTS device, a wireless telephone, a soft phone (e.g., Voice-over-Internet Protocol (IP) (VoIP) phone), etc.

STB 108-4 may receive content and output the content to TV 108-5 for display. STB 108-4 may include a component (e.g., a cable card or a software application) that plugs into a host device (e.g., a personal computer, TV 108-5, a stereo system, etc.) that allows the host device to display content. STB 108-4 may also be implemented as a home theater personal computer (HTPC), an optical disk player (e.g., digital video disk (DVD) or Blu-Ray™ disc player), a cable card, etc. STB 108-4 may receive commands from other devices in environment 100, such as remote control 108-6. In one embodiment, STB 108-4 may include a microphone and/or a camera.

TV 108-5 may include speakers as well as display. TV 108-5 may play content, for example, received from STB 108-4. While some embodiments of devices described below may interact with TV 108-5, other embodiments may interact with any device (e.g., computer 108-2 or mobile phone 102-2).

Remote control 108-6 may issue wired or wireless commands for controlling other electronic devices, such as TV 108-5 or STB 108-4. Remote control 108-6, in conjunction with STB 108-4, may allow a user to interact with an application running on STB 108-4. Other types of devices (e.g., a keyboard, a mouse, a mobile phone, etc.) may be used instead of remote control 108-6, or may be included in remote control 108-6.

Call center 110 may receive calls for servicing customers. Call center 110 may receive either/both IP calls (e.g., SIP calls) or time division multiplexed (TDM) calls (e.g., SS7/ Integrated Service Digital Network (ISDN)). In handling incoming calls, call center 110 may receive CMS services from network 104, for example, to block denial-of-attack calls. Depending on call center 110's arrangement with network 104, call center 110 may receive CMS services from network 104 when the number of calls is high or when a specific event occurs. In some cases, call center 110 may receive CMS services from network 104 independently of the number of calls.

Call center 110 may include one or more servers (e.g., "network devices") that manage and/or store information associated with providing service to customers. As shown in FIG. 1, call center 110 may include a gateway device 112, a proxy 114, call routing system 116, and call agent devices 118-1 through 118-N (collectively "agent devices 118," individually "agent device 118").

Gateway device 112 may include one or more devices that allow different data networks to communicate and cooperatively carry traffic. For example, gateway device 112 may adapt between SS7 signaling and session initiation protocol (SIP) signaling, H.323 protocol signaling, or other protocol signaling used by other devices in environment 100. In one implementation, gateway device 112 may convert TDM encoded voice signals to packetized data suitable for transport to and processing by a proxy device, such as proxy 114. In another implementation, gateway device 112 may receive TDM encoded voice signals and allow such calls to be terminated at TDM devices (e.g., phones).

Gateway device 112 may also include one or more session border controller (SBC) devices that provide control of the boundary between different service provider networks, provide signaling protocol compatibility between an IP-based network and other service provider networks, or control the transport boundary between service provider networks. In one embodiment, gateway device 112 may correspond to an ingress point to proxy 114.

Proxy 114 may provide signaling services to establish sessions between devices, such as home phone 108-3 and an agent device 118. Proxy 114 may include a server or computer that is able to receive data from gateway device 112 and forward the received data to an appropriate device or system, such as call routing system 116 using a session signaling protocol, such as SIP or H.323. Proxy 114 may also receive data from call routing system 116 and forward the received data to other devices, such as gateway device 112, for example.

Call routing system 116 may distribute calls to one of agent devices 118. Call routing system 116 is illustrated as being external from proxy 114. In some implementations, call routing system 116 may include proxy 114. Call routing system 116 may forward calls to one of agent devices 118 according to an algorithm based on, e.g., which of agent devices 118 has an available customer service agent, the type of issue or problem the customer is experiencing, the skill set of the customer service agent (e.g., technical skill, language skill, product knowledge, etc.), the experience of the customer service agent, the type of call, the type of customer, etc.

Agent device 118 may include a workstation, computer, or another type of device for a customer service agent to use for handling calls from customers. Agent device 118 may include a telephone, a camera, a microphone, a speaker, and/or a headset including a microphone and speaker. Agent device 118 may also include a software-implemented telephone (e.g., a "soft" phone) or a hardware implemented telephone (e.g., a "hard" phone). Agent device 118 may also include software or hardware for performing packet-based data transmission to transmit data such as voice, video, or text.

In some implementations, agent device 118 may receive information from CMS device 104-3 about calls, in addition to other information pertaining to the caller. The information from CMS device 104-3 may include confidence level/score that the call is a denial-of-service attack call. The confidence level/score may cause the call center agent to ask additional questions to the caller, to provide service to caller, and/or to forward the call elsewhere for additional processing.

In call center 110, once a call(s) is received, one or more of the devices in call center 110 may perform post-processing for the call. The post processing may include receipt of confidence level/score from CMS device 104-3 (e.g., via an application programming interface (API)), and/or forwarding a response to CMS device 104-3.

In FIG. 1, devices in network 104 and/or customer premises 108 may collect call statistics. When a new call for call center 110 arrives at network 104 for switching/routing, one of the devices (e.g., a device in network 104-1 or network 104-2) may request CMS device 104-3 to determine a level of confidence, for the call, whether the call is a denial-of-service attack call based on the call statistics. Depending on the confidence level provided by CMS device 104-3, the device may route the call (when the device has the capability to route the call), drop the call, or test the caller to obtain additional information about the caller. If the device tests the caller, depending on the answer, the device may drop or route the call.

In FIG. 1, the exemplary configuration of devices and networks in environment 100 are illustrated for simplicity. Environment 100 may include more devices, fewer devices, or a different configuration of devices than those illustrated in FIG. 1. For example, environment 100 may include thousands or millions of customer premises, thousands of call centers, hundreds of CMS devices, hundreds of service provider networks, etc. In another example, network 104 may include H.323 network(s) or PSTN network(s).

In some embodiments, the functions performed by two or more devices in environment 100 may be performed by any one device. Likewise, in some embodiments, the functions performed by any one device may be performed by multiple devices. Furthermore, the connections shown in FIG. 1 are exemplary. In other embodiments, additional connections that are not shown in FIG. 1 may exist between devices (e.g., each device may be connected to every other device). The connections in FIG. 1 may also be wireless or wired.

Figure 2:
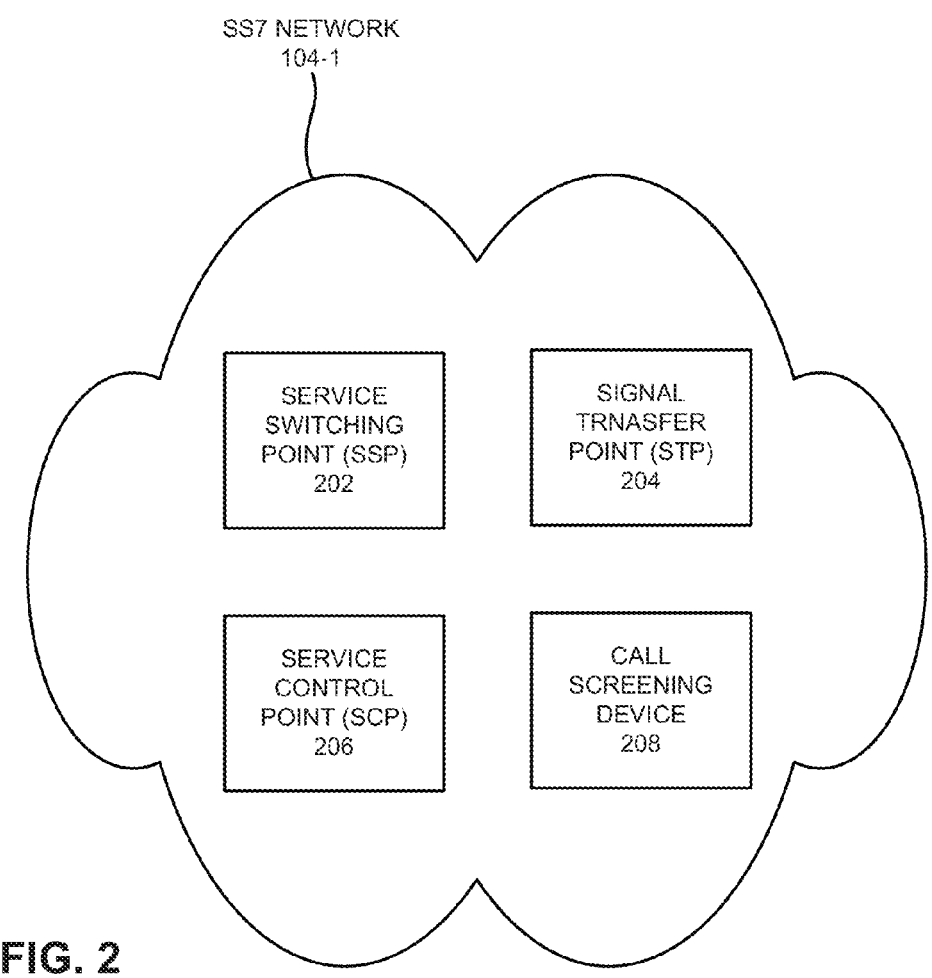
FIG. 2 is a diagram of exemplary components of the Signaling System No. 7 (SS7) network of FIG. 1.

FIG. 2 is a diagram of exemplary components of SS7 network 104-1 in service provider network 104. As shown, SS7 network 104-1 may include a service switching point (SSP 202, a signal transfer point (SIP) 204, a service control point (SCP) 206, and a call screening device 208.

SSP 202 may include switches/devices that source or terminate calls. An SSP device may signal other SSPs to establish a call. In establishing a call, SSP 202 may send a query to SCP 206 to obtain information for routing the call.

STP 204 may route each of incoming messages to one of its outgoing links based on routing information in a message from SCP 206. SCP 206 may include one or more devices for providing routing information to SSP 202 and/or SIP 204.

Call screening device 208, situated in call paths, may screen a particular call or set of calls based on call statistics or information provided by CMS device 104-3. Call screening device 208 may also monitor calls and provide information about the calls to CMS device 104-3.

Depending on the implementation, SS7 network 104-1 may include additional, fewer, different, or a different arrangement of devices than the ones illustrated in FIG. 2. Although SS7 network 104-1 may include many other types of network elements and devices than those illustrated, for simplicity, they are not illustrated in FIG. 2. In some implementations, the functions performed by two or more devices in SS7 network 104-1 may be performed by any one device. Likewise, in some embodiments, the functions performed by any one device may be performed by multiple devices.

For example, in some implementation, SSP 202, STP 204, and/or SCP 206 may include some or all of the functionalities provided by call screening device 208. In such implementations, SIP 202, STP 204, or SCP 206 may provide information about incoming calls to CMS device 104-3. For each call for which SSP 202 and/or SIP 206 receives statistical information from CMS device 104-3, SSP 202 and/or STP 206 may screen the call. Depending on the information, SCP 206 may also use information from CMS device 104-3 to screen calls.

In FIG. 2, no connections are shown. However, connections that are not shown in FIG. 2 may exist between devices (e.g., each device may be connected to every other device). Any such connections may be wireless or wired.

Figure 3:
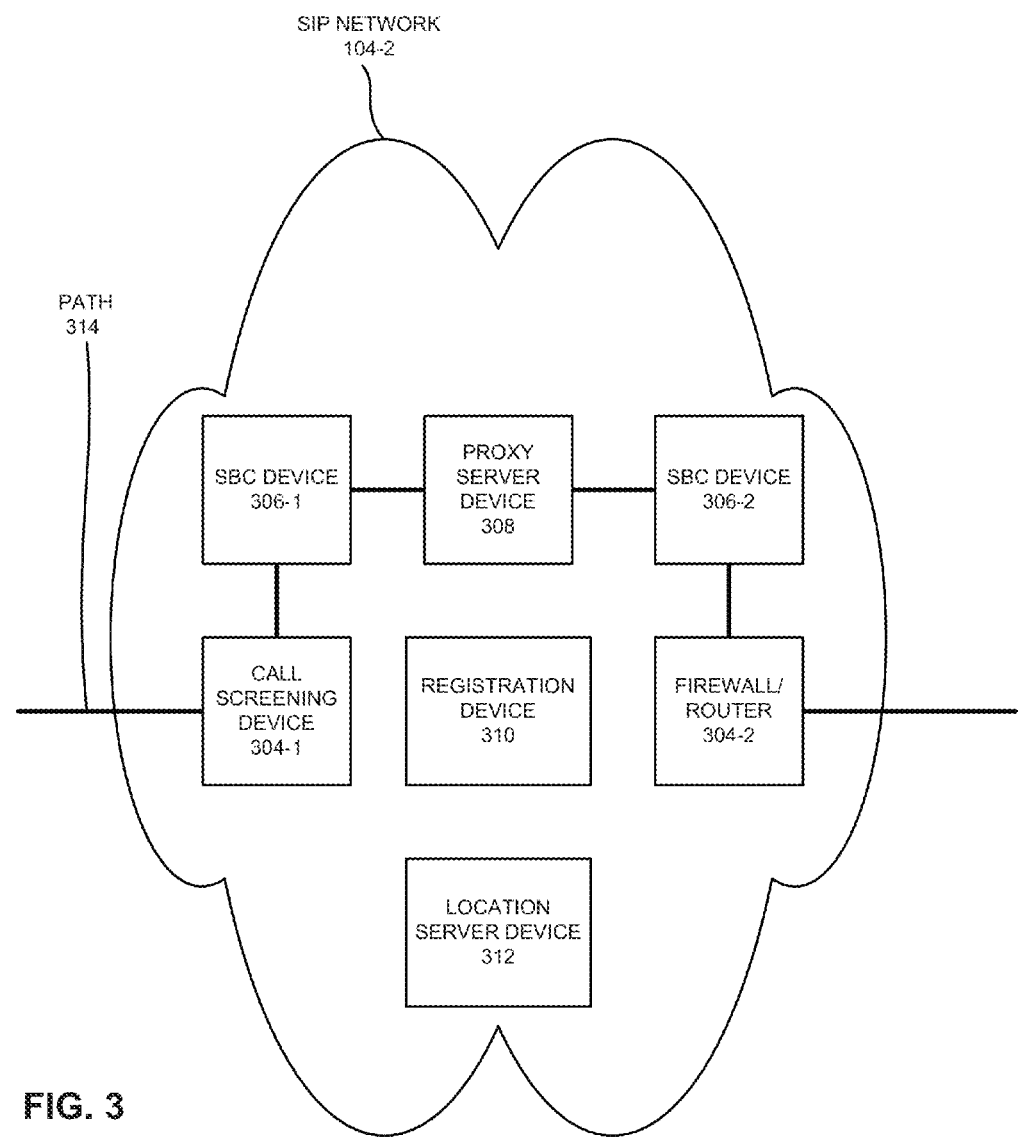
FIG. 3 is a diagram of exemplary components of Session Initiation Protocol (SIP) network of FIG. 1.

FIG. 3 is a diagram of exemplary components of SIP network 104-2. Typically, network 200 may include one or more IP networks that are capable of exchanging packets. As shown in FIG. 3, SIP network 104-2 may include a call screening device 304-1, router/firewall device 304-2, session border controller (SBC) devices 306-1 and 306-2 (collectively "SBC devices 306" and individually "SBC device 306"), a proxy server device 308, a registration device 310, and a location server device 312.

For simplicity, FIG. 3 does not show other network components, such as switches, bridges, SIP redirection servers, etc., or all interconnections (e.g., connections between registration device 310 and other devices). In addition, depending on the implementation, SIP network 104-2 may include fewer, additional, or different devices than those illustrated in FIG. 3. For example, in one implementation, SIP network 104-2 may include additional SBC devices, proxy server devices, registration devices, location servers, a redirect server (not shown), etc. In another example, in some implementations, the functionalities of both registration device 310 and location server device 312 may be combined in a single device.

Call screening device 304-1 may operate similarly to router/firewall device 304-2, described below. In addition, situated in call paths, call screening device 304-1 may screen incoming calls based on call statistics or information provided by CMS device 104-3. Call screening device 304-1 may also monitor calls and provide information about the calls to CMS device 104-3. Although call screening device 304-1 is described as having similar functionalities as call screening device 208, call screening device 304-1 operates in an IP network, with respect to SIP sessions. Call screening device 208, on the other hand, operates in a SS7 system.

Router/firewall device 304-2 may include mechanisms for routing packets, modifying network addresses of packets (e.g., network address translation (NAT)), and for protecting devices in network 104-3 against unauthorized egress/ingress. In some implementations, router/firewall device 304-2 may receive SIP user credentials (e.g., user ID and password) from a user device (e.g., home phone 108-3, mobile device 106, etc.) before router/firewall device 304-2 allows the user device to communicate with another device outside SIP network 104-2.

SBC device 306 may provide for signaling as well as a set up, maintenance, and/or tear down of media channels, such as VoIP sessions, video streams, instant messaging sessions, etc. Proxy server device 308 may include an entity (e.g., a device, an application, etc.) that operates on behalf of another entity, such as a user/client device. In acting on behalf of another entity, proxy server device 308 may route VoIP/IP signaling messages toward their destinations.

Registration device 310 may include a device for registering a user and storing the registration information at location server device 312. The registration process may include receiving SIP user credentials (e.g., a user ID and password that a client/user device receives from a SIP credentials device), binding information (e.g., an association) between an address of record (AOR) (e.g., a uniform resource identifier (URI)) and a network address (e.g., an IP address). Upon successfully authenticating a user, registration device 310 may store the binding information at location server device 312. To initiate the registration, a user/client device may issue a SIP REGISTER command along with the SIP authentication/binding information to registration device 310.

Location server device 312 may include a device at which registration device 310 stores the bindings and the client device information. Other devices in network 104-2, such as proxy server device 308, etc., may obtain the binding information and/or client device information from location server device 312. For instance, proxy server device 308 may obtain an IP address of a client/user from location server device 312, in order to initiate a communication session between SIP applications on the client device and another device (e.g., a device in call center 110).

In some implementations, the functions performed by two or more devices in SIP network 104-2 may be performed by any one device. Likewise, in some embodiments, the functions performed by any one device may be performed by multiple devices.

For example, in some implementation, SBC devices 306, proxy device 308, and/or firewall device 304-2 may include some or all of the functionalities provided by call screening device 304-1. In such implementations, devices 304-1, 304-2, 306, and 308 may provide information about incoming calls to CMS device 104-3. In addition, for each call, device 304-1, 304-2, 306, or 308 may receive statistical information from CMS device 104-3, and may screen calls.

Figure 4:
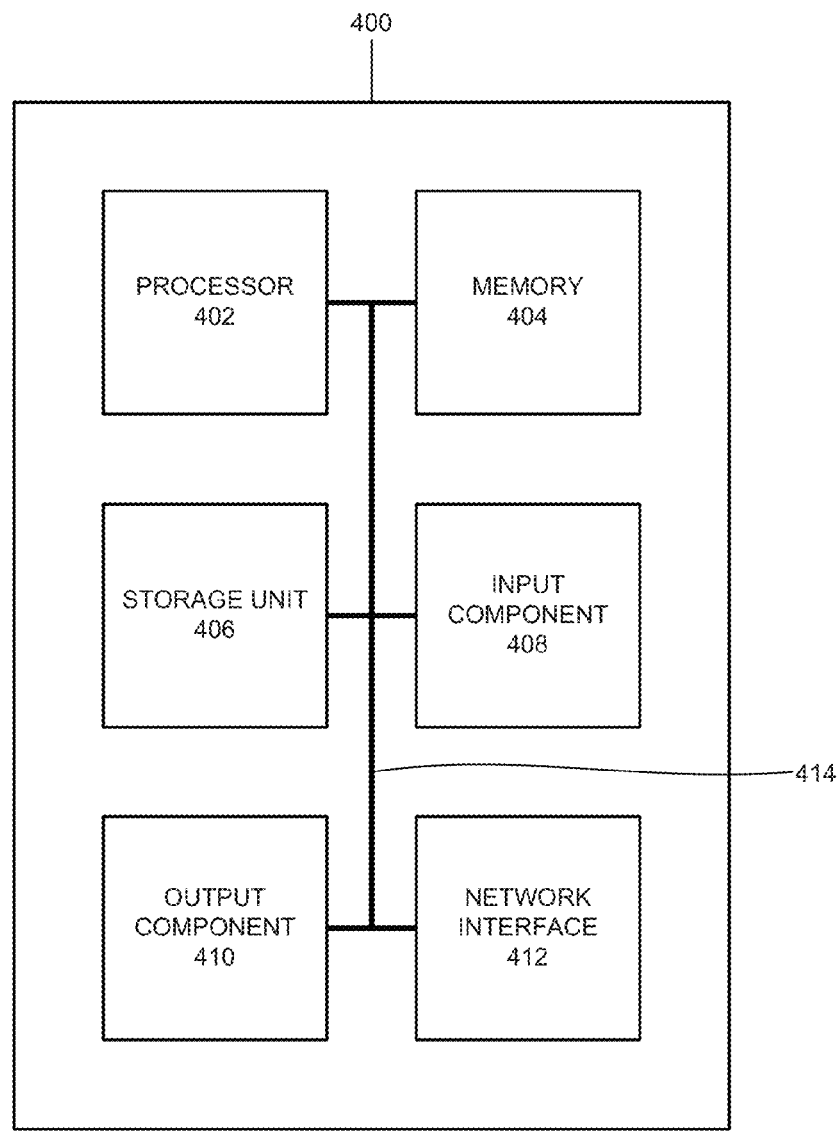
FIG. 4 is a block diagram of exemplary components of a network device of FIG. 1.

FIG. 4 is a block diagram of exemplary components of a network device 400. Network device 400 may correspond to one or more of ONT 108-1, home computer 108-2, home phone 108-3, STB 108-4, TV 108-5, remote control 108-6, gateway device 112, proxy 114, device(s) in call routing system 116, agent devices 118, devices of SSP 202, STP 204, SCP 206, call screening device 208, call screening device 304-1, firewall/router 304-2, SBC devices 306, proxy server device 308, registration device 310, location server device 312, and another device for monitoring/screening calls (e.g., H.323 Gatekeeper, SIP redirection server device, etc.). As shown, network device 400 may include a processor 402, memory 404, storage unit 406, input component 408, output component 410, network interface 412, and communication path 414. In different implementations, network device 400 may include additional, fewer, different, or a different arrangement of components than the ones illustrated in FIG. 4. For example, network device 400 may include line cards for connecting to external buses.

Processor 402 may include a processor, a microprocessor, an Application Specific Integrated Circuit (ASIC), a Field Programmable Gate Array (FPGA), and/or other processing logic (e.g., embedded devices) capable of controlling network device 400. Memory 404 may include static memory, such as read only memory (ROM), and/or dynamic memory, such as random access memory (RAM), or onboard cache, for storing data and machine-readable instructions (e.g., programs, scripts, etc.). Storage unit 406 may include a floppy disk, CD ROM, CD read/write (R/W) disc, and/or flash memory, as well as other types of storage devices (e.g., a hard disk drive) for storing data and/or machine-readable instructions (e.g., a program, script, etc.).

Input component 408 and output component 410 may provide input and output from/to a user to/from network device 400. Input and output components 408 and 410 may include a display screen, a keyboard, a mouse, a speaker, a microphone, a camera, a DVD reader, Universal Serial Bus (USB) lines, and/or other types of components for converting physical events or phenomena to and/or from signals that may be input to or output from network device 400.

Network interface 412 may include a transceiver (e.g., a transmitter and a receiver) for device 400 to communicate with other devices and/or systems. For example, via network interface 412, network device 400 may communicate over a network, such as the Internet, an intranet, a terrestrial wireless network (e.g., a WLAN, WiFi, WiMax, etc.), a satellite-based network, art optical network, etc. Network interface 412 may include a modem, an Ethernet interface to a LAN, and/or an interface/connection for connecting network device 400 to other devices (e.g., a Bluetooth interface).

Communication path 414 may provide an interface through which components of network device 400 can communicate with one another.

Network device 400 may perform the operations described herein in response to processor 402 executing software instructions stored in a non-transient computer-readable medium, such as memory 404. A computer-readable medium may include a physical or logical memory device. The software instructions may be read into memory 404 from another computer-readable medium or from another device via network interface 412. The software instructions stored in memory 404 may cause processor 402 to perform processes that are described herein.

Figure 5:
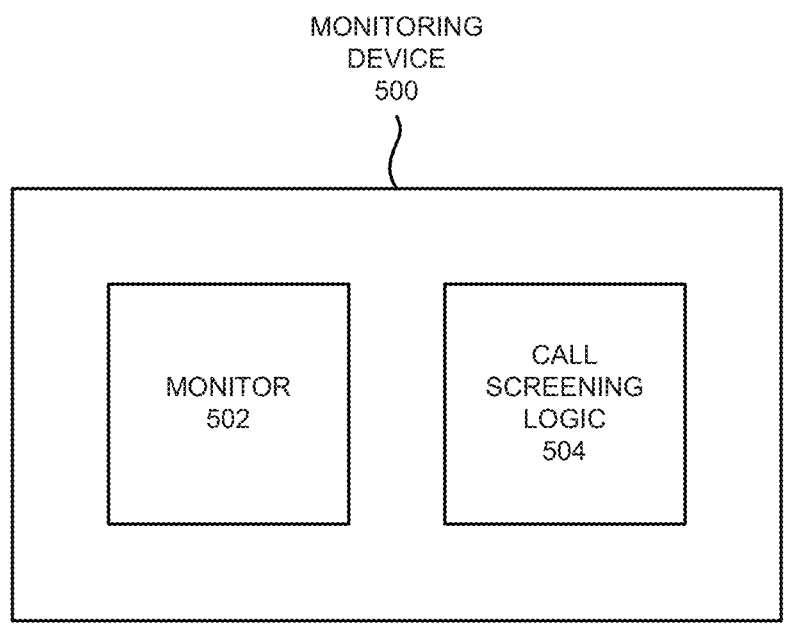
FIG. 5 is a block diagram of exemplary functional components of a monitoring device.

FIG. 5 is a block diagram of exemplary functional components of a monitoring device 500. Monitoring device 500 may correspond to ONT 108-1, STB 108-4, SSP 202, STP 204, SCP 206, call screening device 208, call screening device 304-1, firewall/router device 304-2, SBC devices 306, proxy device 308, devices in a PSTN, or devices in H.323 network (e.g., H.323 Gatekeeper). As shown, monitoring device 500 may include a monitor 502 and call screening logic 504. Depending on the implementation, monitoring device 500 may include additional, fewer, different, or a different arrangement of components than those illustrated in FIG. 5. Furthermore, although monitoring device 500 may include additional functional components, they are not illustrated in FIG. 5 for simplicity (e.g., an operating system, web server, device drivers, communication software, etc.).

Monitor 502 may receive a notification about an incoming call and may collect information about the call. For example, given a call, monitor 502 may record the time of the call (e.g., the time of day, the day of week, the month, and/or the year), a source telephone number for the call, an IP address associated with the call if the call is VoIP, a universal resource identifier (URI), a duration of the call, a value of a field in a SIP signaling message (e.g., a P-asserted identity, From/To, etc.), charge, etc. Monitor 502 may send the recorded data to CMS device 104-3 when monitor 502 detects the call or the end of the call. Alternatively, monitor 502 may aggregate data from multiple calls, and send the aggregated data to CMS device 104-3, periodically or upon demand from CMS device 104-3.

Call screening logic 504 may include hardware and/or software components for receiving instructions, from CMS device 104-3, that indicate whether an incoming call is to be dropped, forwarded/routed, or tested. In a different implementation, call screening logic 504 may send a query to CMS device 104 for instructions on dropping the call. In the query, call screening logic 504 may include any information that monitor 502 obtained about the call. Upon receipt of a response from CMS device 104-3, call screening logic 504 may drop/block the call, forward/route the call toward its destination, and/or test the calling party.

Depending on whether the incoming call is for a text session, video conferencing, or an audio communication (e.g., a phone call), call screening logic 504 may provide different types of tests. For example, if the incoming call is a request for text-based session, call screening logic 504 may send a text query to the caller, requesting that the caller answer a simple question (e.g., type a specific sequence of characters, select a number, provide a result of adding two numbers, provide a result of subtracting one number from another number, spell out a phonetic word, identify an image/picture, identify a sound, provide an answer to a simple true/false question, etc.).

In another example, if the incoming call is a request for a phone call, call screening logic 504 may send a voice message to the caller, requesting the caller to provide a keypad/voice input in response to a question (e.g., "Please repeat the following numbers by pressing on your phone key pad, 13, 19, and 24," "To proceed please answer the following question. What is the sum of 12 and 24?," etc.).

In each of the preceding examples, when the caller provides a response, call screening logic 504 may determine whether the response is correct. If the response is correct, call screening logic 504 may conclude that the calling party is a person (or a desired calling agent), and route the call toward its destination. Otherwise, call screening logic 504 may drop/block the call. In some implementations, call screening logic 504 may conclude that, based on the answer, other similar calls are also made by a person/desired calling agent or a computer/machine, and accordingly drop or route the calls.

In some implementations, call screening logic 504 may provide a "passive" test (un addition to or without a request to provide an answer to question(s)), in which a caller is screened or tested, in a way transparent to the user, based on analysis of data. Examples of such tests include analyzing background noise (e.g., determining whether the background noise level is within a typical variance (e.g., for detecting callers that send screeching noise for the purpose of annoying agents at call center 110)), measuring randomness of key press delays (e.g., automated dialers do not share the same dial entropy as a human does between digit entries, so entering, for example, 1-2-3 by an automated dialer has a different time delay profile than that of a person/desired calling agent), etc. In such analyses, historical data and trending data may also be used to determine validity of the call, in addition to rate/speed-of-data entry, entropy, etc. The data from testing may be provided to monitor 502, which in turn may send the data to CMS device 104-3. CMS device 104-3 may use such data immediately, or for building trending data, and/or training its analysis system to avoid false positives in detecting denial-of-service attacks.

In testing the calling party, call screening logic 504 may temporarily "park" the call, establish a temporary session with the calling party, request a response during the temporary session over the communication link, receive a response from the caller, determine whether the response indicates that the caller is a person/desired calling agent and not a computer/machine, and forward the call (e.g., redirect the call) if call screening logic 504 determines that the caller is a person/desired calling agent. To determine whether the response from the caller is correct, call screening logic 504 may perform voice recognition, image recognition (e.g., in the case of video conferencing), text analysis (e.g., recognize words), etc. to extract information from the caller response.

Figure 6:
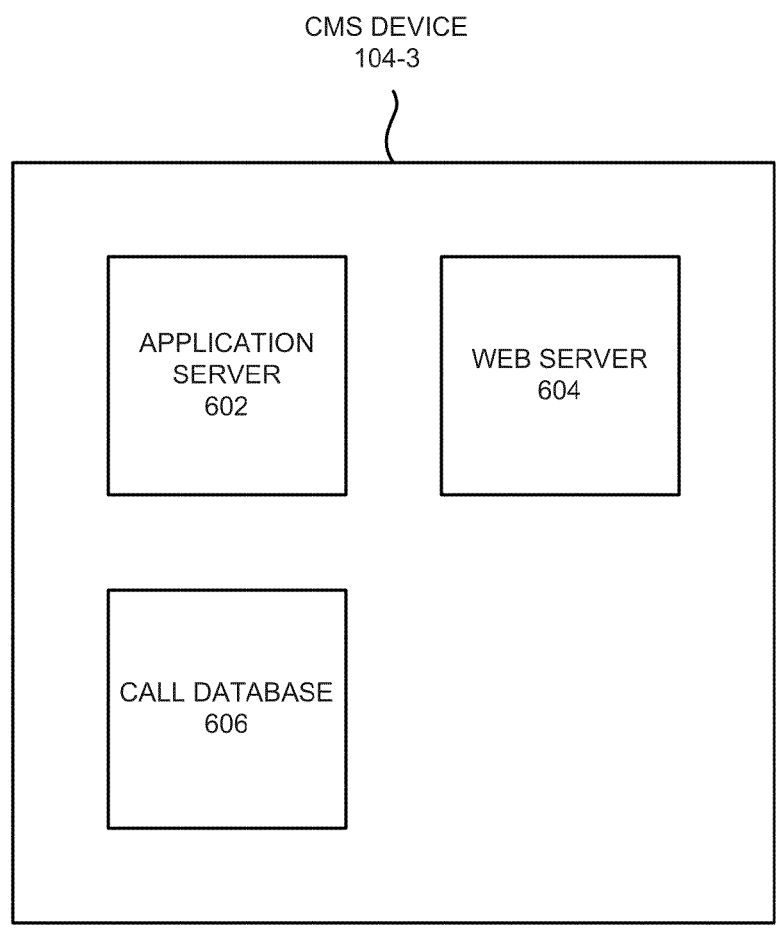
FIG. 6 is a block diagram of exemplary functional components of a confidence metric server (CMS) device of FIG. 1.

FIG. 6 is a block diagram of exemplary functional components of CMS device 104-3. As shown, CMS device 104-3 may include an application server 602, a web server 604, and call database 606. Depending on the implementation, CMS device 104-3 may include additional, fewer, different, or a different arrangement of components than those illustrated in FIG. 6.

Application server 602 may provide application to service client requests. As described in greater detail with respect to FIG. 7, application server 602 may collect data about calls from one or more monitoring devices 500, send monitoring devices 500 information about a confidence level of calls (i.e., whether calls are likely to be a denial-of-service attack), determine/compute statistical data based on the data about calls (e.g., for analysis).

In addition, application server 602 may provide statistical information to call center 110 or to any other customer/partner with whom service provider network 104 has an arrangement to provide such data. In some implementations, application server 602 may provide business logic for other functions, such as authentication, authorization, etc.

Web server 604 may provide an interface via which application server 602 renders its services. For example, web server 604 may send a page to a device in call center 110 for the user to obtain data about a specific call. In another example, web server 604 may provide a user interlace for a login. When a user enters the password/user ID, application server 602 may attempt to authenticate the user based on the password/user id relayed by web server 604.

Call database 606 may include data collected via application server 602 from monitoring devices 500. For each call that monitoring device 500 receives and for which monitoring device 500 collects data, monitoring device 500 may send the data to application server 602. Application server 602 may store the data in call database 606.

In some implementations, when application server 602 computes a confidence level for calls, application server 602 may store the confidence level in call database 606. In some implementations, when data arrives from monitoring device 500, application server 602 may update and store call statistics in call database 606. Exemplary information stored in call database 606 is described below with reference to FIG. 8.

Figure 7:
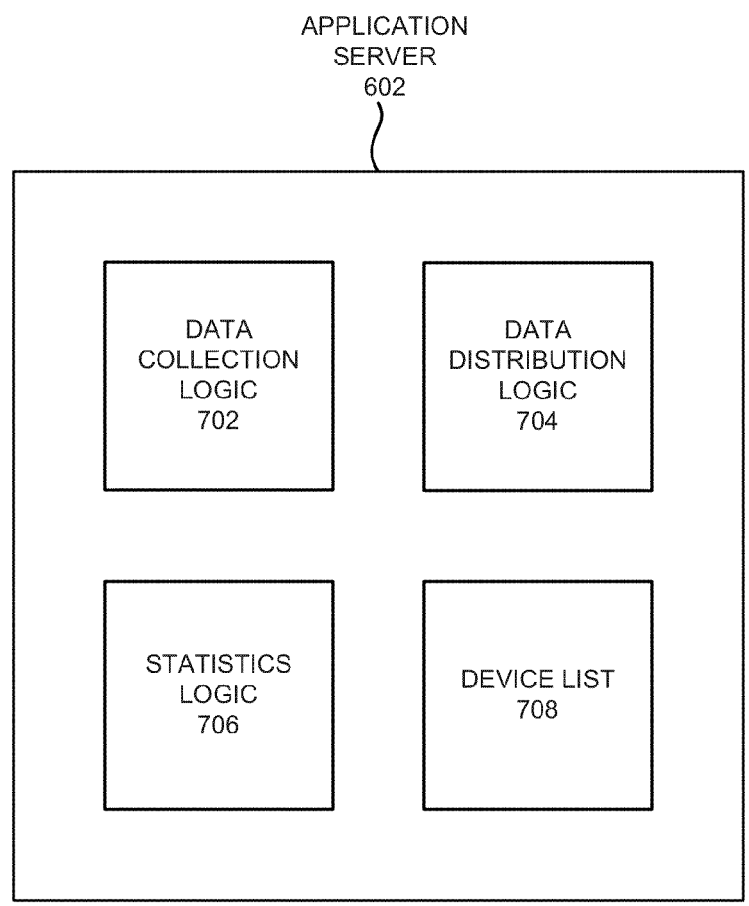
FIG. 7 is a block diagram of exemplary functional components of the application server of FIG. 6.

FIG. 7 is a block diagram of exemplary functional components of application server 602. As shown, application server 602 may include data collection logic 702, data distribution logic 704, statistics logic 706, and device lists 708. These components of application server 602 may be implemented in hardware/software appropriate for supporting particular business logic. For example, in some implementations, application server 602 may written in C#, Java, Perl, or in a combination of different computer languages. In one implementation, the applications may run on one or more instances of a Java virtual machine.

Data collection logic 702 may include a hardware/software component for collecting call data from monitoring devices 500. Data collection logic 702 may collect the data incrementally (e.g., as each call arrives at monitoring device 500), or aggregate data. Data collection logic 702 may format and/or store the data (e.g., formatted data) in call database 606. In collecting data, data collection logic 702 may contact monitoring devices 500 that are listed in device list 708.

For some calls whose information that data collection logic 702 obtains, data collection logic 702 may contact one or more devices in call center 110 to determine whether the calls are part of a denial-of-service attack. Based on the feedback from call center 110, data collection logic 702 may store information indicating whether a call has been determined as part of an attack in call database 606.

Data distribution logic 704 may distribute data in call database 606 to monitoring devices 500 (e.g., periodically or upon demand), to devices in call center 110, and/or to user(s) authorized to access the data. For example, data distribution logic 704 may send a confidence level information, in response to receipt of a query from monitoring device 500 about a call, via application server 602, to monitoring device 500. In another example, data distribution logic 704 may send such information to agent device 118 in call center 110.

In addition, data distribution logic 704 may instruct call screening devices 208 and/or 304-1 and call screening logic 504 in monitoring devices 500 to screen calls (e.g., either upon receipt of requests from devices 208/304-1 or logic 504 or without receiving such requests). In instructing such devices to drop calls, forward/route calls, and/or to test the callers, data distribution logic 704 may employ different strategies. For example, in one implementation, data, distribution logic 704 may instruct the devices to allow only a fraction of the calls in a detected event to be dropped or tested.

Statistics logic 706 may compute/determine statistics for the call data in call database 606, store the determined call statistics (e.g., call distributions over different variables, such as a number of calls, call duration, call time, etc.), and/or provide the statistics to another component (e.g., data distribution logic 704) or to a user. For example, given a call, statistics logic 706 may determine its confidence level that the call is a denial-of-service attack call, based on call data (i.e., by determining a proportion of calls with the same characteristics as the call being a denial-of-service attack).

In some implementations, statistics logic 706 may analyze call data, infer information from the call data, and store the inferred information in call database 606. The inferred information may be used for determining the confidence level, of a call, that the call is part of a denial-of-service attack. For example, statistics logic 706 may determine whether a call is from a set of origination points identified by a corresponding set of information. For example, statistics logic 706 may determine whether a call is from a set of phone numbers from which calls originate in a pattern and indicate the result of its determination in call database 606. More specifically, for example, statistics logic 706 may determine whether a caller number is part of an increasing or decreasing sequence of caller phone numbers for calls made about the same time to a specific call center. Similarly, statistics logic 706 may determine whether a caller IP address (when the call is a VoIP) is part of an increasing or decreasing sequence of IP addresses of calls made about the same time.

In some cases, statistics logic 706 may apply its analysis to a specific customer link. For example, statistics logic 706 may provide an analysis of F-link (fully associated link) in SS7 network or its equivalent in SIP network 104-2/another network (e.g., H.323, PSTN, etc.). That is, statistics logic 706 may provide analysis on the monitored customer link, and provide a result of the analysis to the customer (e.g., call center 110).

Device list 708 may include one or more lists of devices from which data collection logic 702 may obtain data (e.g., devices in call center 110, monitoring devices 500, etc.) and/or lists of devices to which data distribution logic 704 may send information.

FIG. 8 illustrates an exemplary portion 800 of call database 606. Portion 800 includes information received from monitoring devices 500. Database 606 may include other portions, such as a table that includes computed statistical information for a call center. As shown, portion 800 may include one or more of row 801. Each field in row 801 may include a call ID field 802, source/type field 804, destination/type field 806, source location field 808, time field 810, duration field 812, call center field 814, year-month-day field 816, and denial-of-service attack field 816.

Call ID field 802 may include an alphanumeric string that identifies a caller (e.g., a phone number). Source/Type field 804 may include an alphanumeric string that identifies the source (e.g., an IP address, a phone number, etc.) and the type of communication being originated (e.g., Time Division Multiplexed (TDM), IP call, etc.). Destination/Type field 806 may include an alphanumeric string that identifies the destination (e.g., an IP address, a phone number, etc.) and the type of communication established at the destination (e.g., TDM or IP).

Source location 808 may include an alphanumeric string that identifies the location of the call (e.g., address, city name, county, longitude and latitude, etc.). Time field 810 and duration field 812 may identify the time of the call and the duration of the call. Call center field 814 may identify the call center to which the call is directed (e.g., the call center of the destination). Year-month-day field 816 may indicate the year, month, and day of the call.

Denial-of-service/attack field 818 may indicate whether the call is a denial-of-service attack call. Whether the call is a denial-of-service attack may be determined by information from call center 110, or based in inferential information. For example, assume that a call has been received; that a large number of calls are made from phone numbers that begin with digits 703-434, between 12:00 and 1:00 p.m.; that the calls have been determined as denial-of-service attack; and that the call is from 703-434-1234 and is made at 12:59. In such an instance, statistics logic 706 may infer that the call is also part of the denial-of-service attack, and indicate this in field 816 for the call in call database 606.

Depending on the implementation, row 801 may include additional, fewer, different, or a different arrangement of fields than those illustrated in FIG. 8. In some implementations, for example, row 801 may include additional fields whose values are provided by data collection logic 702 and statistics logic 706. More specifically, for example, row 801 may include a field that indicates whether the call is part of a call event. A "call event," as used herein, may refer to a collection of calls with a set of same characteristics (e.g., calls that are made with a particular area code, calls with the same source 11P address, calls that are made between 12:00 p.m. and 12:05, calls whose numbers are interrelated to one another by a pattern, etc.). When statistics logic 706 detects a call event and determines that a call is part of the event, statistics logic 706 may indicate this in a field.

In another example, row 801 may include a field that indicates whether the caller IP address (when the call is a VoIP) that is part of an increasing or decreasing sequence of IP addresses of calls in a call event. Other implementations may include fields that indicate whether the calling number is part of other patterns (e.g., calls originating from a set of limited set of numbers in a specific pattern). Other examples include fields for a P-asserted identity in a SIP message, From/To values in a SIP message, Request-Universal Resource Identifier (R-URI), etc.

In some implementations, row 801 may also include fields that may be used in determining a likelihood of false positives for detected denial-of-service attacks. For example, a field may include a special promotion time (e.g., a time period after a commercial requesting potential purchaser to call). Such an event may increase the likelihood that a group of calls in a short time interval are not a denial-of-service attack.

Figure 9:
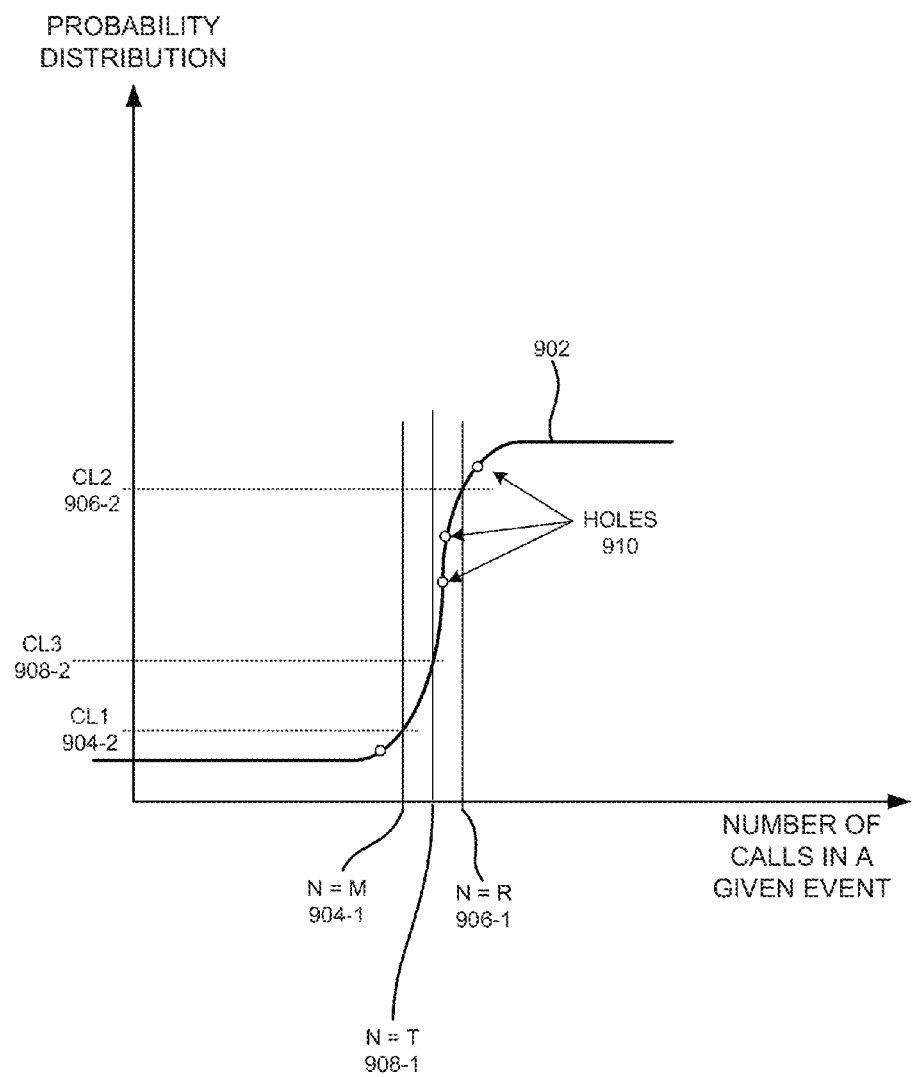
FIG. 9 illustrates an exemplary probability distribution for the likelihood of calls being part of a denial-of-service attack.

FIG. 9 illustrates an exemplary probability distribution for the likelihood of calls being part of a denial-of-service attack. As shown, probability distribution 902 is plotted as a function of the number of calls per call event, observed over many call events. That is, the number of calls is the random variable.

In one implementation, statistics logic 706 may obtain distribution 902 (or another distribution, for the likelihood of calls being a denial-of-service attack, conditioned on different set of characteristics) based on information from call database 606. For example, statistics logic 706 may detect events based on call database 606, where an event is a collection of calls sharing a set of same values for a selected set of fields (e.g., one of more of fields 802-816 or other fields).

More specifically, for example, an event may include calls having originating IP addresses 171.12.14.xxx, where xxx stands for a wildcard (see field 804 for row 801), lasting for 20-40 seconds (field 812), and destined for call center 110 (see field 814). Statistics logic 706 may detect many such events in call database 606, with each event occurring at different times. Assuming that each of such events includes different number of calls, and that it is known whether each of the events is a denial-of-service attack, statistics logic 706 may plot probability distribution 902, as a function of the number of calls over the events.

In FIG. 9, when the number of calls (N) in an event is equal to M 904-1, the probability of that event being a denial-of-service attack is CL1 904-2 (or confidence level CL1). When N in an event is equal to R 906-1, the probability of the event being a denial-of-service attack is CL2 906-2 (or confidence level CL2). That is, for each observed N, there is a corresponding confidence level based on a ratio of a number of events that are denial-of-service attacks and a number of events that are not denial-of-service attacks. When a new event conditioned on the same set of field values (e.g., fields in FIG. 8) as the events in plot 902 occurs, statistics logic 706 may determine the confidence level that the new event is a denial of service attack based on plot 902.

For example, assume that T number of calls are made to call center 110. Statistics logic 706 may look up N=T 908-1 on plot 902, and determine that the corresponding confidence level is CL3 908-2. If a particular value of N has not been observed (e.g., plot 902 has a hole at the particular value of N; for a given N, the number of observed events being denial-of-service attacks is zero and the number of observed events not being denial-of-service attacks is zero; etc.), statistics logic 706 may interpolate the confidence level based on similar events (e.g., different N's). The interpolation may be linear or based on functions of higher powers.

Depending on the implementation, statistics logic 706 may not have pre-computed plots 902. In such implementations, when a new event occurs, statistics logic 902 may determine its confidence level based on information, in call database 606, that may be used to generate plot 902.

Figure 10A:
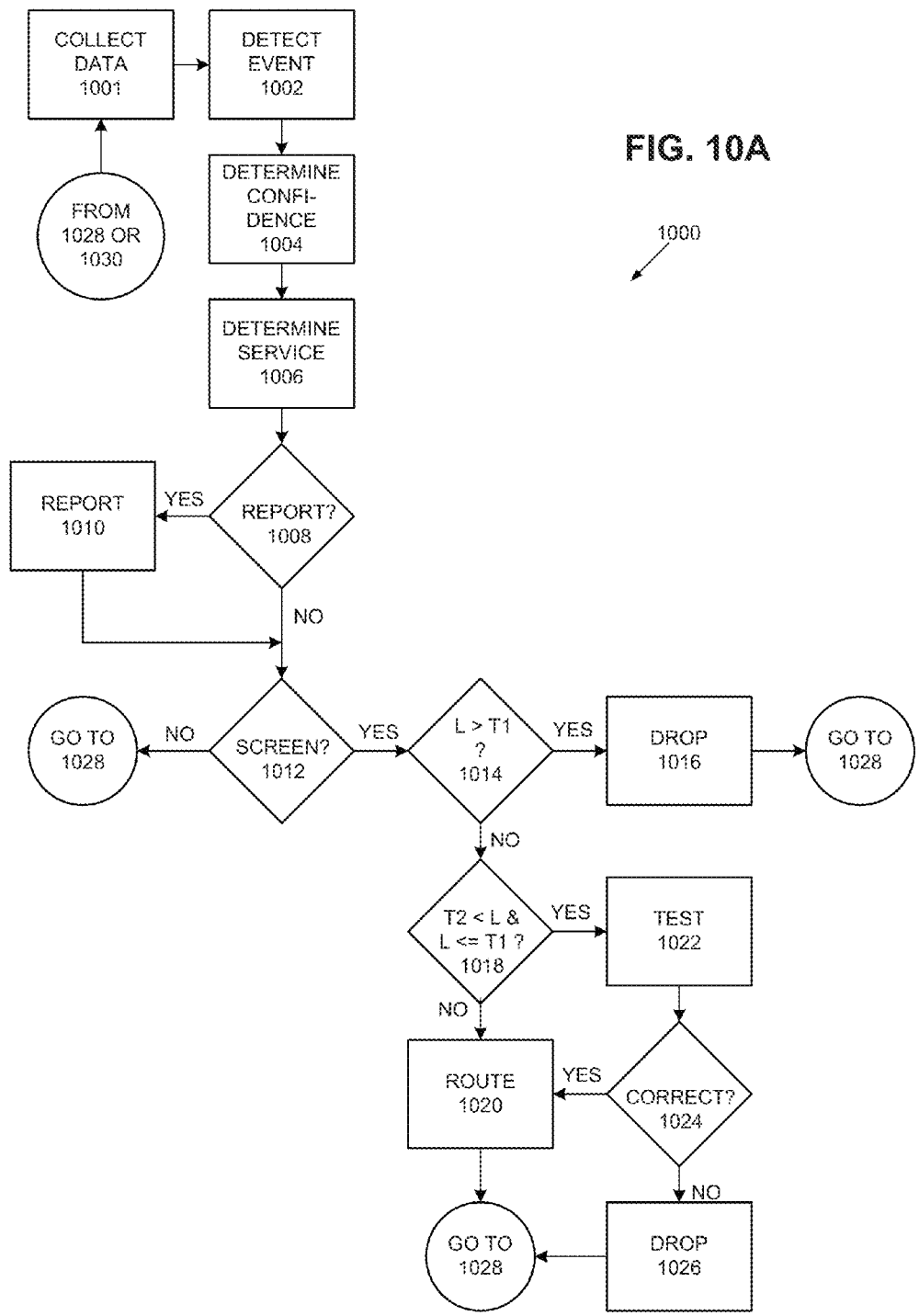
FIGS. 10A and 10B are flow diagrams of an exemplary process that is associated with the service provider network of FIG. 1.
Figure 10B:
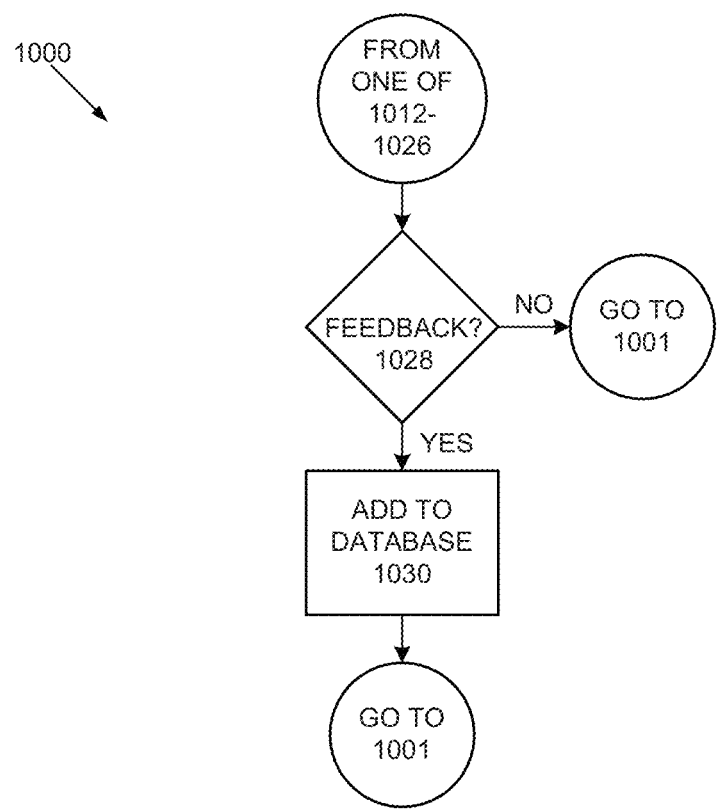

FIGS. 10A and 10B are flow diagrams of an exemplary process 1000 that is associated with service provider network 104. Process 1000 may be performed by one or more devices in service provider network 104. However, in the following, process 1000 is described in terms of CMS device 104-3 and/or monitoring device 500. Assume that 2,000 calls (N) to call center 110 arrived at network 104 between 10:00 and 10:05 a.m.; that the calls are to be routed to call center 110; and that monitoring devices 500 have detected the calls, and sent data pertaining to the calls to CMS device 104-3. Also, assume that call center 110 requested service provider network 104 to monitor incoming calls.

Process 1000 may include CMS device 104-3 collecting call data (block 1001) (e.g., via data collection logic 702). In one implementation, monitoring devices 500 may push call data to CMS device 104-3. In a different implementation, CMS device 104-3 may periodically poll monitoring devices 500 for the call data. CMS device 104-3 may run an instance of statistics logic 706 to monitor the call data collected by CMS device 104-3.

CMS device 104-3 may detect a call event (block 1002). As explained above, detecting a call event may include obtaining a list of calls that share a number of characteristics. In detecting the event, CMS device 104-3 may also determine the number of calls in the event.

For example, assume that one type of event is defined in statistics logic 706 as calls originating from IP addresses with the common A, B, and C classes within 10 minute span of time and directed to one call center. In this case, statistics logic 706 may determine that a potential denial-of-service attack event has occurred, with the event including 2,000 calls between 10:00 and 10:05 a.m.

CMS device 104-3 may determine a particular service to which call center 110 is subscribed, for events that are detected by statistics logic (block 1006). In some implementations, CMS device 104-3 may contact another device or a database that stores account information for call center 110. In other implementations, CMS device 104-3 may keep a local image/store of such information. In one implementation, the services may include reporting the event or screening additional calls (to be received) that are a continuation of the same event.

If the service to which call center 110 is subscribed includes reporting (block 1008: yes), CMS device 104-3 may report the event to call center 110 (block 1010), and process 1000 may proceed to block 1012. Otherwise (block 1008: no), CMS device 104-3 may proceed to block 1012.

If the service to which call center 110 is subscribed does not include screening (block 1012: no), process 1000 may proceed to block 1028. Otherwise (block 1012: yes), CMS device 104-3 may determine whether the confidence level (determined at block 1004) is greater than a first threshold (block 1014).

If the confidence level is greater than the first threshold (block 1014: yes), process 1000 may proceed to block 1016, where some or all of the additional calls (belonging to the same event) are dropped, via monitoring devices 500. For example, in one implementation, CMS device 104-3 may contact monitoring device 500 to drop the calls.

Depending on the implementation or user preferences (e.g., preferences of call center 110), different strategies/algorithms may be used for selecting calls to drop. For example, CMS device 104-3 may instruct monitoring devices 500 to drop a fraction (e.g., ½, ⅓, . . . or 1/N) of the calls that belong to the same event and whose destination/termination is call center 110. In another example, CMS device 104-3 may cause monitoring device 500 to drop/route calls intermittently. In yet another example, CMS device 104-3 may cause monitoring device 500 to drop just enough calls to prevent call center 110's call handling capacity from being overloaded.

Returning to block 1014, if the confidence level is less than or equal to the first threshold (block 1014: no), CMS device 104-3 may proceed to block 1018. At block 1018, if the confidence level is equal to or less than the first threshold and the confidence level is greater than a second threshold, CMS device 104-3 may instruct monitoring device 500 to test, for some or all of the calls in the event, whether the caller is a person/desired calling agent (e.g., a person/agent initiating a call using a phone) or a program/computer/machine (e.g., an automated caller) (block 1022).

As described above, the type of test(s) performed by monitoring device 500 may depend on the type of communication session to be established between the caller and call center 110 (e.g., text messaging, audio call, video conferencing, etc.). In some instances, one or more of the test(s) may "passive" and be transparent to the caller, without caller interaction. A passive test may include collecting information about the call (e.g., background noise, key press time delays/entropy, etc.) without interacting with the user, to determine whether the caller is a person/desired agent or a computer/machine. As also described above, the test(s) may include querying, by monitoring device 500, the caller with a question that can easily be answered correctly by a person/calling agent, but is difficult to be answered correctly by a program, a computer, or a machine.

Depending on the implementation, the testing may be performed on every call or on certain fraction of the calls, in the manner similar to that described above for dropping the calls at block 1016. In these implementations, the tested calls are used as samples for making statistical inferences about the remaining calls (e.g., a number of callers in the event failed the test, and therefore, other callers in the event are highly likely to fail the test). Thereafter, process 1000 may proceed to block 1024.

At block 1024, for each tested call, if the answer from the caller is correct (block 1024: yes) or the result of the test meets a validation requirement (e.g., noise level is less than a threshold), monitoring device 500 may allow the call to pass or route the call (block 1020). Depending on the screening strategy, monitoring devices 500 may pass/route all or some of the other calls in the event.

At block 1024, for each of the calls, if the answer from the caller is incorrect (block 1024: no) or the result of the test does not validate the call (e.g., in cases where the test is passive), monitoring device 500 may drop the call (block 1026). Depending on the screening strategy, monitoring devices 500 may drop only those calls for which incorrect answers are provided by the callers, or a fraction of the calls with the incorrect answers, etc., in a manner similar to that described above for block 1016. Thereafter, process 1000 may proceed to block 1028.

Returning to block 1018, if the confidence level is not between the first threshold and the second threshold (i.e., not T2<L<=T1), CMS device 104-3 may allow monitoring devices 500 to pass/route the calls (block 1020). Again, depending on the screening strategy, CMS device 104-3 may allow monitoring devices 500 to pass/route some or all of the calls. Thereafter, process 1000 may proceed to block 1028.

FIG. 10B illustrates blocks 1028-1032 of process 1000. As shown, process 1000 further includes CMS device 104-3 determining whether there is available feedback for the call event from call center 110 (block 1028). The feedback may indicate whether the call event is a denial-of-service attack.

If there is no feedback (block 1028: no), process 1000 may return to block 1001. If there is feedback (block 1028: yes), process 1000 may add the feedback information about the call event to call database (block 1030). For example, for calls that are part of the event and listed in call database 606, CMS device 104-3 may fill in denial-of-service attack field 816 as "YES" or "NO," depending on whether the feedback indicates that the calls are indeed a denial-of-service attack.

As described above, a system may collect call statistics. When new calls arrive at the network, the system determines a level of confidence, for the calls, that the calls are denial-of-service attack calls based on the call statistics. The system may provide information about the calls to a client, to which the calls are to be forwarded/routed, route the call to the client, test the callers to obtain additional information about the callers, or drop one or more of the calls.

When the system tests a caller, the system may request the caller to answer a question. If the answer to the question is correct, the system may determine that the caller is likely to be a person/desired calling agent rather than a machine, and switch/route the call to the client. If the answer is incorrect, the system may drop the call.

The system may provide the client with an opportunity to provide a feedback about the calls. If the client does provide a feedback, the system may use the feedback to augment the call statistics.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, call screening/monitoring have been described for SS7 and SIP networks. However, call screening/monitoring may be performed in devices in other types of network (e.g., PSTN, H.323 network, etc.). These networks may feed call data to CMS device 104-3 for analysis and/or providing CMS services (e.g., screening calls) to call center 110.

In another example, while series of blocks have been described with regard to an exemplary process illustrated in FIGS. 10A and 10B, the order of the blocks may be modified in other implementations. In addition, non-dependent blocks may represent acts that can be performed in parallel to other blocks. Furthermore, one or more of the blocks may be omitted in other implementations.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving data collected by a network for calls that are to be routed by the network to a call center;
    detecting, by a network device, an event based on the received data;
    determining a confidence level, for the event, that the event is a denial-of-service attack;
    identifying a plurality of calls associated with the event;
    dropping one or more calls, of the plurality of calls associated with the event, when the confidence level is above a first threshold;
    testing at least one call, of the plurality of calls associated with the event, when the confidence level is less than or equal to the first threshold and greater than a second threshold; and
    routing the plurality of calls associated with the event to the call center when the confidence level is less than or equal to the second threshold.

2. The method of claim 1, wherein detecting the event includes:
    identifying, based on the data, a group of calls among the calls that are to be routed to the call center, that have a specific set of characteristics associated with the event.

3. The method of claim 2, wherein the characteristics include one or more of:
    an Internet Protocol (IP) address associated with a calling party;
    a call center identifier associated with a destination of a call;
    a duration of a call;
    a value of P-asserted identity in a Session Initiation Protocol (SIP) message for a Voice-over-IP call;

a field value in a SIP message for a VoIP call; or
a phone number associated with an originating point of a call.

4. The method of claim 1, wherein determining the confidence level includes:
determining a likelihood that the detected event is a denial-of-service attack based on a first number of events and a second number of events,
wherein the first number of events, which have same characteristics as the event, are denial-of-service attacks, and the second number of events, which have the same characteristics as the event, are not denial-of-service attacks.

5. The method of claim 4, wherein when the first number of events is zero and the second number of events is zero, the method further comprises obtaining the likelihood by interpolating likelihoods of different types of observed events.

6. The method of claim 1, wherein the calls that are to be routed to the call center include:
a video conferencing call;
a text messaging call; or
an audio call.

7. The method of claim 1, further comprising:
reporting the confidence level to the call center.

8. The method of claim 1, wherein testing the at least one call includes:
establishing a temporary session with the at least one call;
collecting information from a caller of a particular call of the at least one call over the session;
determining whether the information meets a condition; and
dropping the particular call if the information does not meet the condition.

9. The method of claim 8, further comprising:
dropping some or all of the plurality of calls associated with the event when the information does not meet the condition.

10. The method of claim 8, wherein collecting the information includes:
sending a text request;
sending a request to respond to images;
sending a voice request;
collecting a noise level in the call; or
measuring delays between key presses.

11. The method of claim 8, wherein collecting the information includes requesting at least one of:
the caller to repeat a sequence of alphanumeric characters;
the caller to provide an answer to a simple arithmetic;
the caller to identify a picture;
the caller to identify a sound; or
the caller to provide an answer to a simple true or false question.

12. The method of claim 1, further comprising:
receiving a feedback from the call center on whether the event is a denial-of-service attack; and
using the feedback to characterize the event as a denial-of-service attack or not a denial-of-service attack.

13. A device comprising:
a network interface for the device to communicate with other devices in a network;
a memory to include instructions;
a processor to execute the instructions to:
receive data collected, by one or more devices in a network, for calls that are to be forwarded by the network to a call center;
detect an event based on the received data;
determine a confidence level, for the event, that the event is a denial-of-service attack;
identify a plurality of calls associated with the event;
drop one or more calls, of the plurality of calls associated with the event, when the confidence level is above a first threshold;
test at least one call, of the plurality of calls associated with the event, when the confidence level is less than or equal to the first threshold and greater than a second threshold;
and
forward the plurality of calls associated with the event when the confidence level is less than or equal to the second threshold.

14. The device of claim 13, wherein the calls that are to be forwarded to the call center include one of:
a time division multiplexed (TDM) call; or
a Session Initiation Protocol (SIP) call.

15. The device of claim 13, wherein at least one of the one or more devices in the network is configured to:
monitor one or more calls that are to be forwarded by the network.

16. The device of claim 15, wherein the one or more devices include at least one of:
a router;
a Session Border Controller (SBC) device;
a device of a Service Switching Point (SSP);
a device in a signal transfer point (STP);
a device in a service control point (SCP);
a device in H.323 network;
a device in plain old telephone system (POTS) network; or
a call screening device.

17. The device of claim 16, wherein the call screening device is configured to:
receive instructions from the device to screen one or more calls, of the plurality of calls associated with the event; and
screen the one or more calls.

18. The device of claim 17, wherein, when the call screening device screens the one or more calls, the call screening device is further configured to:
test a caller of one of the one or more calls by querying the caller.

19. A non-transitory computer-readable medium comprising computer executable instructions that, when executed by a processor, cause the processor to:
receive data collected by a network for calls that are to be directed by the network to a call center;
detect an event based on the received data;
compute a confidence level, for the event, that the event is a denial-of-service attack;
identify a plurality of calls associated with the event;
drop one or more calls, of the plurality of calls associated with the event, when the confidence level is above a first threshold;
test at least one call, of the plurality of calls associated with the event, when the confidence level is less than or equal to the first threshold and greater than a second threshold; and
direct the plurality of calls associated with the event to the call center when the confidence level is less than or equal to the second threshold.

20. The computer-readable medium of claim 19, wherein, when detecting the event, the computer executable instructions cause the processor to:
identify, based on the received data, a group of calls among the calls that are to be directed to the call center, that have a specific set of characteristics associated with the event.

* * * * *